United States Patent
Salomon-Bahls et al.

(10) Patent No.: US 6,419,281 B1
(45) Date of Patent: Jul. 16, 2002

(54) PLUG-TYPE CONNECTOR FOR COMPRESSION SYSTEMS

(75) Inventors: Bernd Salomon-Bahls, Halver; Harald Hagen, Wipperfurth, both of (DE)

(73) Assignee: Armaturenfabrik Hermann Voss GmbH + Co., Wipperfurth (DE)

(*) Notice: Subject to any disclaimer, the term of this patent is extended or adjusted under 35 U.S.C. 154(b) by 0 days.

(21) Appl. No.: 09/454,736

(22) Filed: Dec. 6, 1999

(51) Int. Cl.⁷ .................................................. F16L 35/00
(52) U.S. Cl. ........................... 285/307; 285/322; 285/39
(58) Field of Search ........................... 285/39, 322, 323, 285/243, 81

(56) References Cited

U.S. PATENT DOCUMENTS

| | | | |
|---|---|---|---|
| 5,042,848 A | * 8/1991 | Shiozaki | 285/277 |
| 5,160,179 A | * 11/1992 | Takagi | 285/340 |
| 5,181,751 A | 1/1993 | Kitamura | |
| 5,284,369 A | * 2/1994 | Kitamura | 285/322 |
| 5,320,390 A | 6/1994 | Kodama | |
| 5,722,696 A | * 3/1998 | Taneya | 285/39 |
| 5,738,387 A | * 4/1998 | Guest | 285/322 |
| 5,918,913 A | * 7/1999 | Lewis et al. | 285/148.14 |
| 6,079,750 A | * 6/2000 | Kacines | 285/62 |
| 6,145,894 A | * 11/2000 | Myers | 285/322 |

FOREIGN PATENT DOCUMENTS

| | | |
|---|---|---|
| DE | 197 55 531 | 6/1999 |
| EP | 287791 | 10/1988 |
| EP | 459016 | 12/1991 |
| EP | 545377 | 6/1993 |

* cited by examiner

Primary Examiner—Kathy Matecki
Assistant Examiner—Kenneth Thompson
(74) Attorney, Agent, or Firm—Kilpatrick Stockton LLP

(57) ABSTRACT

Plug-type connector for compression systems, having a housing part and a plug part. The plug part has a plug shaft that can be hermetically inserted into a receptacle opening of the housing part and releasably arrested by a retainer element. Retainer projections, elastically movable in the radial direction, seat the retainer element in an arrested position between an inner annular shoulder in the receptacle opening and an outer annular shoulder of the plug shaft. The retainer element on the plug shaft is axially displaceable between a safety position in which the retainer projections are blocked, and a release position in which the retainer projections are freed for radial release movement.

8 Claims, 3 Drawing Sheets

PLUG-TYPE CONNECTOR FOR COMPRESSION SYSTEMS

The present invention pertains to a plug-type connector.

Such plug-type connectors have long been known in various variations from numerous publications. Cited here only by way of example is EP 0 005 865 B 1.

Fundamental to the present invention is an objective of creating a further design of such a plug-type connector, which is characterized by simple and economical production and installation, as well as good functionality and ease of operation.

According to the invention, this is realized by way of the characteristics of claim. Advantageous refinements are contained in the subordinate claims.

Figure 1:
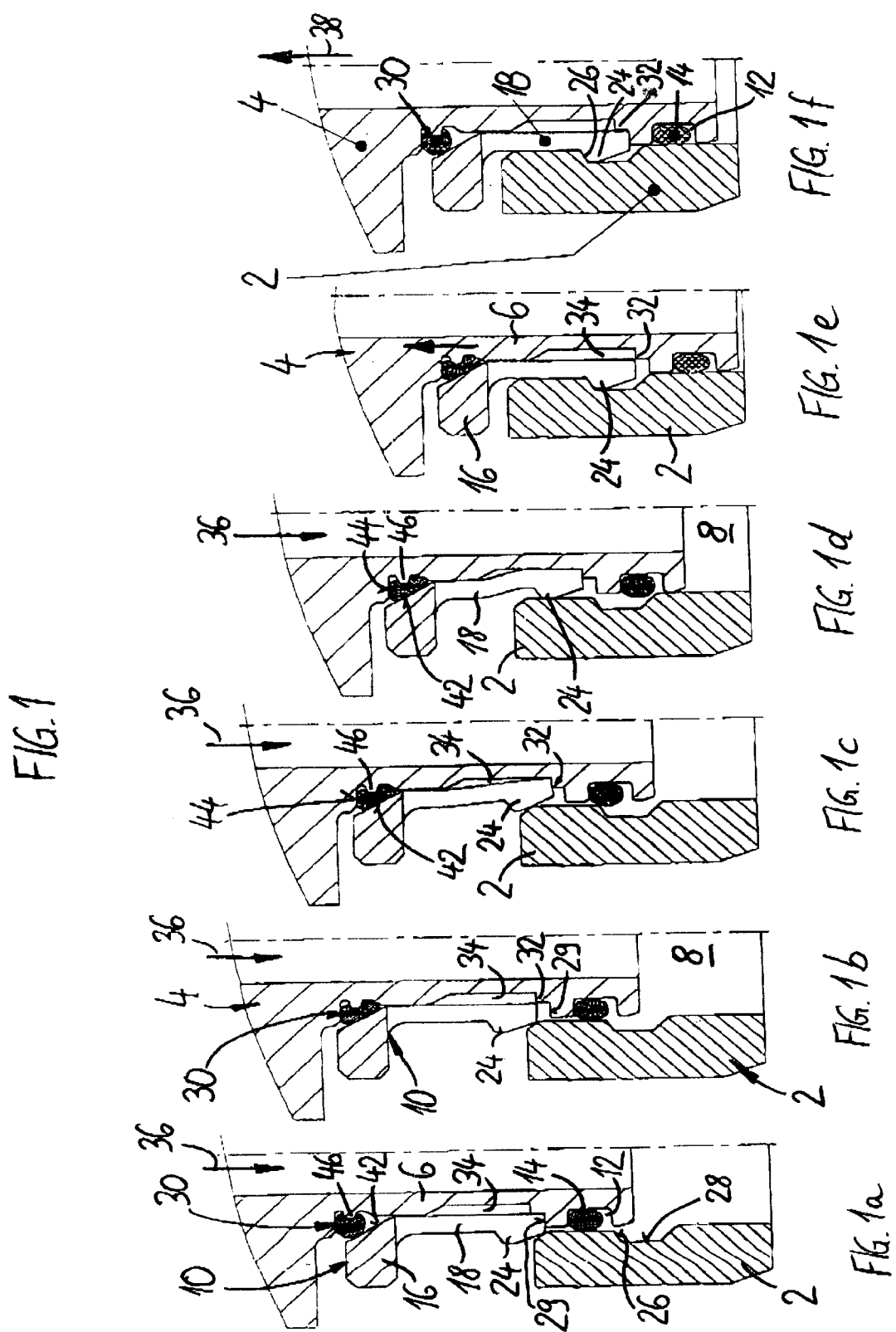
Figure 2:
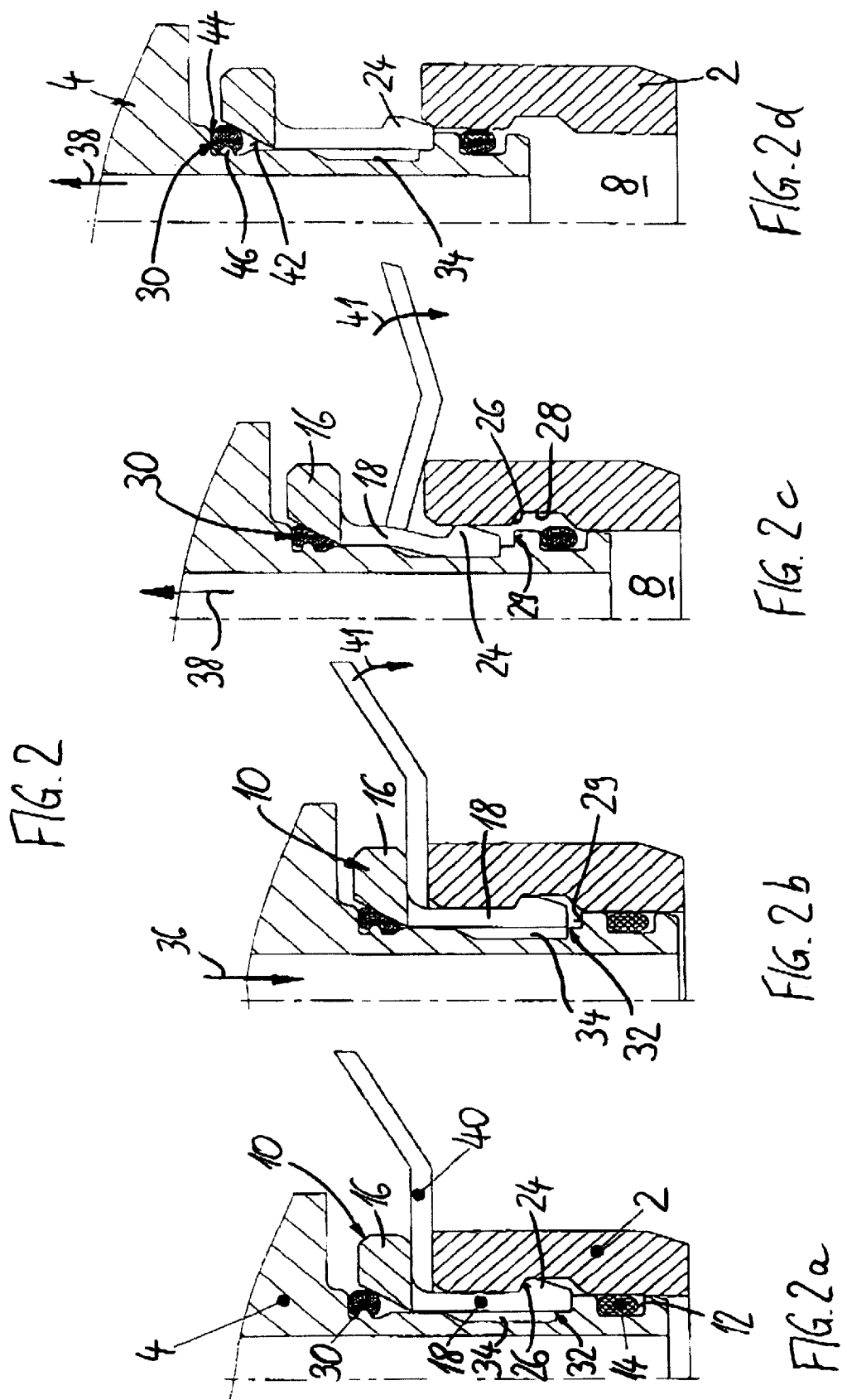
Figure 3:
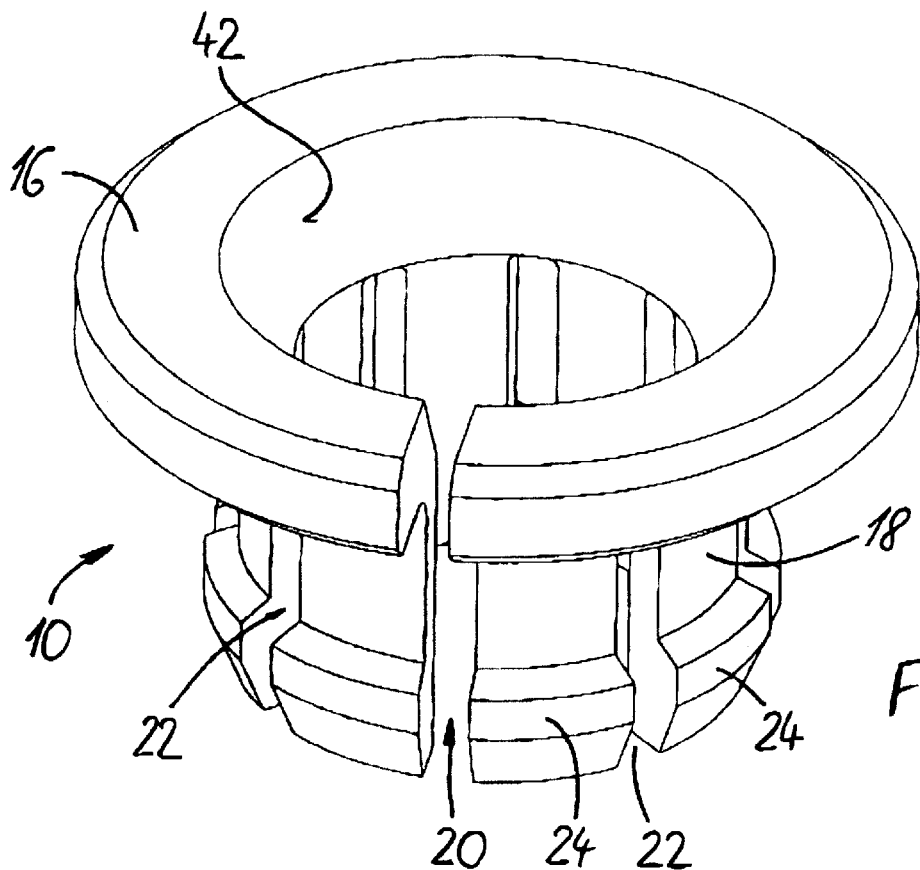
Figure 4:
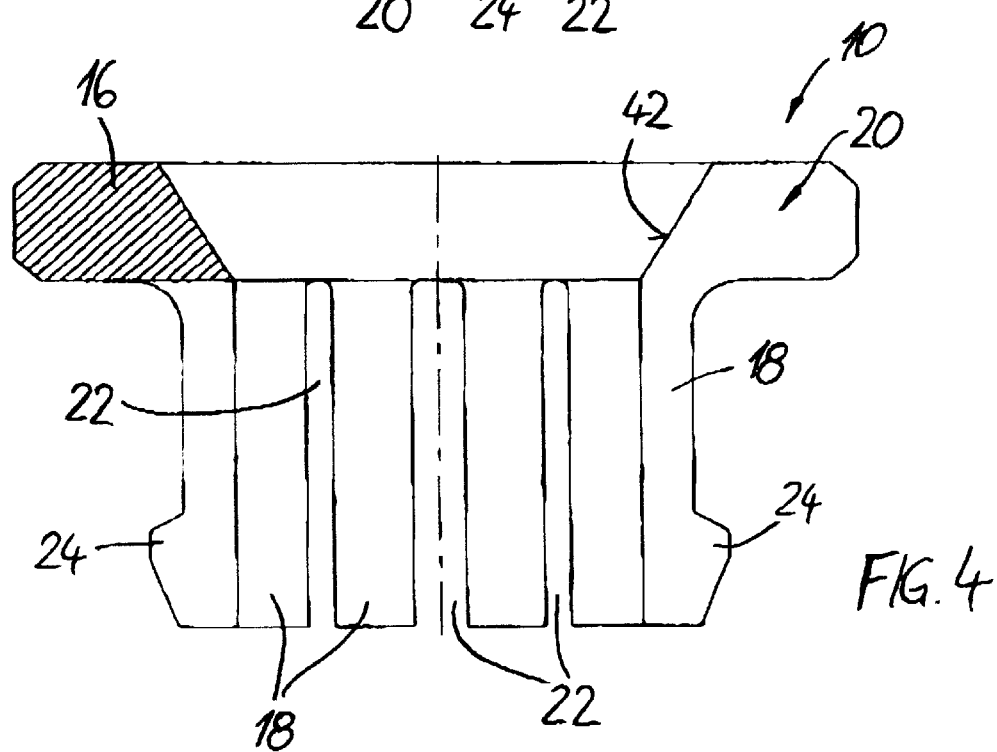

The invention is explained in greater detail with references to a preferential embodiment example illustrated in the appended drawings. These depict:

FIG. 1, i.e., 1a–1f, in each case in semiaxial cross section, the plug-type connector of the invention in various positions during the plug-in operation;

FIG. 2, i.e., 2a–2d, further semiaxial views of the plug-type connector of the invention in various positions during the unplugging operation;

FIG. 3, a separate, enlarged, perspective view of the retainer element according to the invention; and FIG. 4, an axial cross section of the retainer element.

As depicted in FIGS. 1 and 2, a plug-type connector according to the invention consists of a housing part (2) and a plug part (4). With a plug shaft (6), the plug part (4) can be plugged tightly into a receptacle opening (8) of the housing part (2) and releasably arrested by means of a retainer element (10). For sealing, the plug shaft (6) bears a sealing ring (14) in an outer annular groove (12) in the area of its free end.

The retainer element (10) depicted separately in FIGS. 3 and 4 consists of an annular section (16) and, joined thereto in one piece, spring-elastic locking arms (18) extending axially and distributed over the perimeter of the annular section (16). In the depicted example, eight locking arms (18) are provided. The retainer element (10) has at a point on its circumference a slit (20), which goes completely through both axially and radially, as well as slits (22) leading out from the annular section (16) between the respective locking arms (18). By virtue of the continuous slit (2), the entire retainer element (10) can be elastically widened, whereby the retainer element (10) can be assembled onto or disassembled from the plug shaft (6). By way of the slits (20) and (22), the locking arms (18) with their free ends directed away from the annular section (16) are elastically movable in the radial direction.

The retainer element (10) rests on the plug shaft (6) in such a way that the latter together with the locking arms (18) can be inserted axially into the receptacle opening (8). In the plugged-in position (cf.: FIGS. 1e, 1f, 2a, 2b) the annular section (16) remains outside the receptacle opening (8) as the activation element for the retainer element (10).

The locking arms (18) have on their free ends retainer projections (24) jutting radially outward, which in the plugged-in arrested position fit into an inner annular shoulder (26) that widens the receptacle opening (8). Preferably, the annular shoulder (26) is designed as the flank of an inner annular groove (28). Furthermore, the plug shaft (6) has a radial annular groove (29), which in the arrested position rests axially on the free ends of the locking arms (18) to prevent dislodgement.

The retainer element (10) is axially displaceable on the plug shaft (6) between a safety position (FIGS. 1a, 1f, 2a, 2d) and a release position (FIGS. 1b–1e, 2b, 2c). Between the plug part (4) and the displaceable retainer element (10) a spring element (30) is arranged in such a way that the retainer element (10) moves automatically into its safety position but can be forcibly moved relative to the plug part (4) against spring action into the release position by moving in a direction facilitating the release or withdrawal of the plug part (4). The spring element (30) can be advantageously designed as a rubber-elastic ring, which provides the spring power when elastically compressed by the described relative movement between the plug part (4) and the retainer element (10).

The plug shaft (6) has a safety section (32), which in the locked position of the retainer element (10) secures the free ends of the locking arms (18) against movement in the radially outward direction. When viewed in the release direction, a free space (34) formed by the reduction of the outer diameter of the plug shaft (6) adjoins the safety section (32). The axially measured lengths of the described components and the range of movement of the retainer element (10) on the plug part (4) are so designed in keeping with the invention and mutually adapted that the manner of operation described below is achieved.

The plug-in operation is illustrated in FIG. 1 (1a–1f). When the plug shaft (6) is inserted, the retainer element (10) retainer projections (24) on the free end section of the locking arms (18) come to rest on the rim of the receptacle opening of the housing part (2). When the plug part (4) is then inserted further in the direction indicated by the arrow (36), this effects a relative displacement of the retainer element (10) against the spring force of the spring element (30) in such a way that the free ends of the locking arms (18) come loose from the safety section (32) and move into the adjoining range of the free space (34). Thereby the locking arms (18) can be elastically deformed in such a way that their free ends can relax radially inward into the free space (34) and then the plug shaft (6), together with the retainer element (10) and with the retainer projections (24) of the locking arms (18), can be further inserted in the direction of the arrow (36) (FIGS. 1b–d). Subsequently, the retainer element (10) then locks in place in that the locking arms (18) move radially outward elastically and the retainer projections (24) engage behind the inner annular shoulder (26) (FIG. 1e). Ultimately, the spring element (30) effects a reflex displacement of the plug shaft (6) relative to the retainer element (10) in the release direction (arrow 38), whereby the free ends of the locking arms (18) are again radially supported by the safety section (32) and are blocked thereby (FIG. 1f).

A subsequent release operation is illustrated in FIG. 2 (2a–2d). Beginning with the arrested position according to FIG. 2a (corresponding to FIG. 1f), the retainer element (10), by means of the annular section (16) functioning as an actuation element and with the help of a suitable loosening tool (40), can be held in the position, in which the retainer projections (24) rest approximately on the annular shoulder (26). Then the plug part (4) can again be pushed in further against the spring element (30) and relative to the retainer element (10) as indicated by the arrow (36), whereby the locking arms (18) are again axially freed from the safety section (32) (FIG. 2b) and can therefore relax radially inward into the free space (34). This takes place when the entire plug part (4) is withdrawn as indicated by the arrow (38) in FIG. 2c, in that the appropriate release force is applied to the retainer element (10) by means of the loosening tool (40). This can be accomplished by a lever-like movement of the loosening tool (40) inserted into a slit between the housing part (2) and the annular section (16) of the retainer element (10) as indicated by the direction of the arrow (41) (cf. FIGS. 2b and 2c). Since the retainer projections (24) and the annular shoulder (26) work together over an oblique, essentially conical surface, the radially outward relaxing movement of the retainer arms (18) is automatically effected by the axial relative movement, while the retainer projections (24) fully clear the annular shoulder (26) and the plug part (4) can be withdrawn in the direction of the arrow (38) (FIG. 2d).

Finally, it is noted that in the contact area of the spring element (30), which is preferably formed by an elastic ring (e.g., an O-ring), the annular section (16) of the retainer element (10) preferably has a conical configuration (42), while the plug part (4) has an axially opposing contact surface (44). Here it can also be advantageous when the rubber-elastic springelement (30) is supported radially inward by an annular extension (46) of the plug part (4) or the plug shaft (6). In this manner, the compression and spring action can be influenced by specified design.

The invention is not limited to the illustrated and described embodiment example, instead it also encompasses all configurations working in the sense of the invention. Furthermore, the invention is also not restricted to the combination of characteristics defined in the claims, but rather can also be defined by any other desired combination of appointed characteristics from the totality of individual characteristics disclosed. This means that fundamentally practically each individual characteristic of the claims can be omitted or replaced by at least one individual characteristic disclosed elsewhere in the application.

What is claimed is:

1. Plug-type connector for compression systems comprising a housing part (2) and a plug part (4), while the plug part (4) with a plug shaft (6) can be hermetically inserted into a receptacle opening (8) of the housing part (2) and releasably arrested by means of a retainer element (10), in that the retainer element (10) is seated, by means of retainer projections (24) elastically movable in the radial direction, in an arrested position between an inner annular shoulder (26) in the receptacle opening (8) and an outer annular shoulder (29) of the plug shaft (6), characterized in that:

the retainer element (10) is borne on the plug shaft (6) as to be displaceable in the axial direction between a safety position, and a release position;

that the retainer projections (24) are blocked in the safety position against a radial release movement and are freed in the release position for a radial release movement; and that between the plug part (4) and the retainer element (10) a spring element (30) is so arranged that the retainer element (10) moves under spring power automatically into the safety position and can be moved into the release position against the spring power.

2. Plug-type connector according to claim 1, characterized in that the retainer element (10) consists of an annular section (16) and axially extended, spring-elastic locking arms (18) joined thereto, while the locking arms (18) have at their free ends radially outward retainer projections (24) pointing in the insertion direction (36) and serving as retainers.

3. Plug-type connector according to claim 1, characterized in that the plug shaft (6) has a safety section (32), which in the safety position of the retainer element (10) supports the retainer projections (24) against a radially inward movement.

4. Plug-type connector according to claim 1, characterized in that the plug shaft (6) has a radially peripheral free space (34) formed by a circumferential reduction, into which the retainer projections (24) can relax radially inward in the release position in such a way that the plug shaft (6) can be inserted into the receptacle opening (8) or withdrawn from the receptacle opening (8).

5. Plug-type connector according to claim 1, characterized in that the annular section (16) of the retainer element (10) is situated outside the receptacle opening (8) as the actuation section even in the plugged-in coupling position.

6. Plug-type connector according to claim 1, characterized in that the retainer element (10) has an axially and radially continuous slit (20) as well as slits (22) running out from the area of the annular section (16) between the individual locking arms (18.

7. Plug-type connector according to claim 1, characterized in that the retainer element (10) has four to ten, locking arms (18).

8. Plug-type connector according to claim 1, characterized in that the spring element (30) is formed by a rubber-elastic ring.

* * * * *